US008844096B2

(12) United States Patent
    Zhu

(10) Patent No.: US 8,844,096 B2
(45) Date of Patent: Sep. 30, 2014

(54) CASTER DEVICE WITH A DIRECTIONAL MECHANISM

(71) Applicant: Wanquan Zhu, Guangdong (CN)

(72) Inventor: Wanquan Zhu, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 13/950,294

(22) Filed: Jul. 25, 2013

(65) Prior Publication Data
    US 2014/0026367 A1    Jan. 30, 2014

(30) Foreign Application Priority Data

Jul. 25, 2012 (CN) .......................... 2012 1 0260366

(51) Int. Cl.
    *B60B 33/00*    (2006.01)
    *B60B 33/02*    (2006.01)
(52) U.S. Cl.
    CPC ................................... *B60B 33/023* (2013.01)
    USPC ......................................................... 16/35 R
(58) Field of Classification Search
    USPC ............ 16/35 R; 280/47.38; 24/713.7, 713.8
    See application file for complete search history.

(56) References Cited

U.S. PATENT DOCUMENTS

| 3,400,424 | A | * | 9/1968 | Altenweger ................... 16/35 R |
| 4,349,938 | A | * | 9/1982 | Fontana ......................... 16/35 R |
| 4,543,685 | A | * | 10/1985 | Kassai ........................... 16/35 R |
| 4,759,098 | A | * | 7/1988 | Ko .................................... 16/29 |
| 4,913,452 | A | * | 4/1990 | Zun ............................. 280/47.41 |
| 5,191,674 | A | * | 3/1993 | Zun .............................. 16/35 R |
| 6,212,733 | B1 | * | 4/2001 | Yeh ............................... 16/35 R |
| 7,377,526 | B2 | * | 5/2008 | Lan ............................ 280/47.38 |
| 2004/0194221 | A1 | | 10/2004 | Thompson |
| 2009/0276977 | A1 | | 11/2009 | Liao |

FOREIGN PATENT DOCUMENTS

| DE | 203 01 436 U1 | 7/2003 |
| EP | 1 905 615 A1 | 4/2008 |
| WO | 9924268 A1 | 5/1999 |
| WO | 2008148169 A1 | 12/2008 |

* cited by examiner

*Primary Examiner* — Victor Batson
*Assistant Examiner* — Matthew Sullivan
(74) *Attorney, Agent, or Firm* — Winston Hsu; Scott Margo

(57) ABSTRACT

The present invention discloses a caster device comprising a column, a wheel module and a directional mechanism. The wheel module is pivoted on the column. The directional mechanism includes a directional component movably disposed inside the wheel module and detachably engaged with the column. A moving direction of the directional component is intersected with a pivoting axis of the wheel module. Because the moving direction of the directional component of the present invention is intersected with the pivoting axis of the wheel module, the column is locked well, so as to result in a better orientation effect by using the directional mechanism. The directional component is movably disposed inside the wheel module, so that the directional component is intersected with the pivoting axis of the wheel module rapidly, so as to increase an operating efficiency for orientation.

19 Claims, 7 Drawing Sheets

CASTER DEVICE WITH A DIRECTIONAL MECHANISM

BACKGROUND OF THE INVENTION

1. Field of the Invention

The present invention relates to a caster device, and more specifically, to a caster device with a directional mechanism.

2. Description of the Prior Art

In modern life, a hand propelled vehicle with a wheel device, such as a stroller, a supermarket cart, a luggage case or an ambulance bed, is widely utilized. The wheel devices for the hand propelled vehicle are generally divided into a directional wheel device and a universal wheel device, based on purposes and requirements of the vehicles. In general, the hand propelled vehicle with the directional wheel device only can be moved in a straight line, so as to ensure stability and directionality of the hand propelled vehicle. However, it is difficult to turn the hand propelled vehicle due to the fixed moving direction of the directional wheel device. As for the hand propelled vehicle with the universal wheel device, since the wheel may rotate in 360 degrees rotation, it may facilitate a user to turn the hand propelled vehicle. However, flexibility of the hand propelled vehicle with the universal wheel device sacrifices stability and directionality. Therefore, it is better to combine advantages and characteristics of the directional wheel device and the universal wheel device for designing a vehicle product, so that the vehicle product can have advantages of the directional wheel device and the universal wheel device at the same time.

Therefore, some manufacturers dispose a directional mechanism on the universal wheel device, so that the universal wheel device can act as the directional wheel device. For example, China application NO. ZL97201025.4 filed in 1998 Nov. 18 discloses an automatic directional movable castor, and a directional mechanism of the caster includes a directional pin, a directional group, a spring and a plurality of directional hole pits. The spring covers the directional pin and is elastically disposed on the directional group. The circumference of a protecting cover of the caster is provided with the plurality of hole pits for the directional pin. The directional group is disposed near the protecting cover of the caster. A principle of orientation is that the pin is pushed by the spring, so that an inserting part of the directional pin protrudes from the directional group to insert into and to contact with the corresponding hole pit. Therefore, a movable caster bracket capable of pivoting is fixed in a directional state and cannot be turned. However, because the directional pin is disposed on the directional mechanism, and the directional mechanism is near the protecting cover of the caster, the directional pin cannot be inserted into the corresponding hole pit rapidly for locking the caster bracket to ensure the directional function. Moreover, a directional effect of this directional mechanism is poor, so that the castor is easily turned from the directional state to a universal state as the castor is turned. Therefore, it is necessary to provide a mechanical design to solve above problems.

SUMMARY OF THE INVENTION

A purpose of the present invention is to provide a caster device capable of changing from a universal state to an orientation state effectively for solving above drawbacks.

In order to achieve the purpose, according to an embodiment of the present invention, the present invention provides a caster device comprising a column, a wheel module and a directional mechanism. The wheel module is pivoted on the column. The directional mechanism includes a directional component movably disposed inside the wheel module and detachably engaged with the column. A moving direction of the directional component is intersected with a pivoting axis of the wheel module.

Preferably, the moving direction of the directional component is orthogonal to the pivoting axis of the wheel module.

Preferably, the moving direction of the directional component is oblique relative to the pivoting axis of the wheel module.

Preferably, the column includes a supporting shaft and a sheath. The sheath covers the supporting shaft and pivoted on the wheel module. The directional component is detachably engaged with the sheath. By an engagement of the directional component and the sheath, it can result in an orientation effect better and fast.

Preferably, the wheel module is pivoted on an outer peripheral of the column. The directional component moves close to the column and inside the wheel module to engage with the column. The directional component moves away from the column and slides into the wheel module to separate from the column.

Preferably, a directional opening is formed on the column, and the directional component passes through the directional opening. It is easy to lock the column by an engagement of the directional component and the directional opening, resulting in the better orientation effect.

Preferably, the column includes a supporting shaft and a sheath. The sheath covers the supporting shaft and pivoted on the wheel module. The directional component is detachably engaged with the sheath. The directional opening includes a through hole formed on the sheath, and an open hole formed on the supporting shaft and communicated with the through hole, and the directional component passes through the through hole and the open hole. Because the directional opening includes the through hole formed on the sheath and the open hole formed on the supporting shaft and communicated with the through hole, the directional component inserts into the directional opening deeper, so that a force of the directional component can overcome a rotational force of the column, so as to lock the column well.

Preferably, an aperture of the through hole is greater than an aperture of the open hole, so as to facilitate the directional component to insert into the directional opening.

Preferably, the directional mechanism further includes an installing base and an operating component. The installing base is disposed on the wheel module, and the directional component is slidably connected to the installing base. The operating component is pivoted on the installing base for driving the directional component.

Preferably, a containing chamber is formed inside the installing base and communicated with the directional opening, and the containing chamber is for containing the directional component. In addition, the containing chamber is not only for containing and directing the directional component, but also for facilitating the directional component to insert into the directional opening.

Preferably, the directional mechanism further includes a connecting component passing through the installing base, the operating component and the directional component. The connecting component can link the operating component, the installing base and the directional component. That is, a force of the operating component can be transmitted to the installing base, and then to the directional component, so as to drive the directional component to perform an orientation operation.

Preferably, a guiding hole is formed on the directional component, an installing hole is formed on the installing base, and an inserting hole is formed on the operating component. The connecting component passes through the inserting hole, the installing hole and the guiding hole. It is more convenient to connect the operating component, the installing base and the directional component, and it simplifies the manufacturing process by a matching connection of the connecting component with the guiding hole, installing hole and the inserting hole.

Preferably, the guiding hole and the installing hole are slots, so that the connecting component slides therewithin. The guiding hole is designed to be a slot, so that the force of the operating component can be transferred as a driving force for driving the directional component via the connecting component. In addition, the design of the slot facilitates the directional component to move forward or backward. The slot design of the installing hole facilitates the operating component to move on the installing base during the orientation operation, so that the force generated by movement of the operating component can be effectively transmitted to the directional component via the connecting component.

Preferably, the directional mechanism further includes a resilient component disposed between the directional component and the connecting component. The resilient component is for driving the directional component to slide.

Preferably, an inner chamber is formed inside the directional component for receiving the resilient component, and the resilient component contacts against an inner wall of the inner chamber and the connecting component. The inner chamber is for receiving and locating the resilient component, and for making the resilient component better contact against the inner wall of the inner chamber and the connecting component, so that a force received by the connecting component can be transmitted to the resilient component rapidly, and then the resilient component drives the directional component to slide.

Preferably, the operating component includes an operating portion and a driving portion. The driving portion is connected to the operating portion and pivoted on the installing base. The driving portion is for driving the directional component.

Preferably, the directional mechanism further includes a pin passing through the installing base and the driving portion. The installing base is easily pivoted on the operating component by the pin. Specifically, as a force is applied to the operating portion of the operating component, the operating component can pivot via the pin on the driving portion, so as to generate a larger force to the directional component to ensure that the directional component is operated smoothly and quickly.

Preferably, a protrusion is formed on one of the driving portion and the installing base, and a first concave and a second concave corresponding to the protrusion are formed on the other one of the driving portion and the installing base. As the operating component rotates to an end position of a rotating region relative to the installing base, the protrusion is engaged with the first concave, and the directional component slidably inserts into the column. As the operating component rotates back to an initial position of the rotating region relative to the installing base, the protrusion is engaged with the second concave, and the directional component slidably moves away from the column. In addition, the operating component is easily fixed on the end position and the initial position by an engagement of the protrusion with the first concave and the second concave. The protrusion can slide away between the first concave and the second concave, so as to facilitate the pivoting operation of the operating component.

Preferably, a guiding portion is formed on an end of the directional component, the end of the directional component is detachably engaged with the column, and a size of an outer peripheral of the guiding portion decreases in a direction from the external portion towards the internal portion of the column. As the caster device turns accidentally when in an orientation mode, the wheel module is forced to rotate to push the directional component which is inserted into the directional opening. At this time, the guiding portion can guide the directional component to slide out of the directional opening, so as to prevent the directional component from being damaged and to result in a protecting function.

Preferably, the guiding portion includes an inclined surface formed on at least one of opposite sides of the directional component.

Preferably, the inclined surface is a planar surface, a curved surface, or an arc surface.

Preferably, the inclined surface faces the pivoting axis of the wheel module.

Preferably, a normal of the inclined surface is intersected with the pivoting axis of the wheel module.

Preferably, the guiding portion is a cone-shaped structure, a tip taper-shaped structure, a square taper-shaped structure, or a pyramidal-shaped structure.

In the present invention, the moving direction of the directional component of the present invention is intersected with the pivoting axis of the wheel module, the column is locked well, so as to result in a better orientation effect of the directional mechanism. The directional component is movably disposed inside the wheel module, so that the directional component is intersected with the pivoting axis of the wheel module rapidly, so as to increase an operating efficiency for orientation. Furthermore, the directional mechanism has a simple structure and may be operated easily, so that the directional mechanism of the caster device can be widely applied in the industry.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
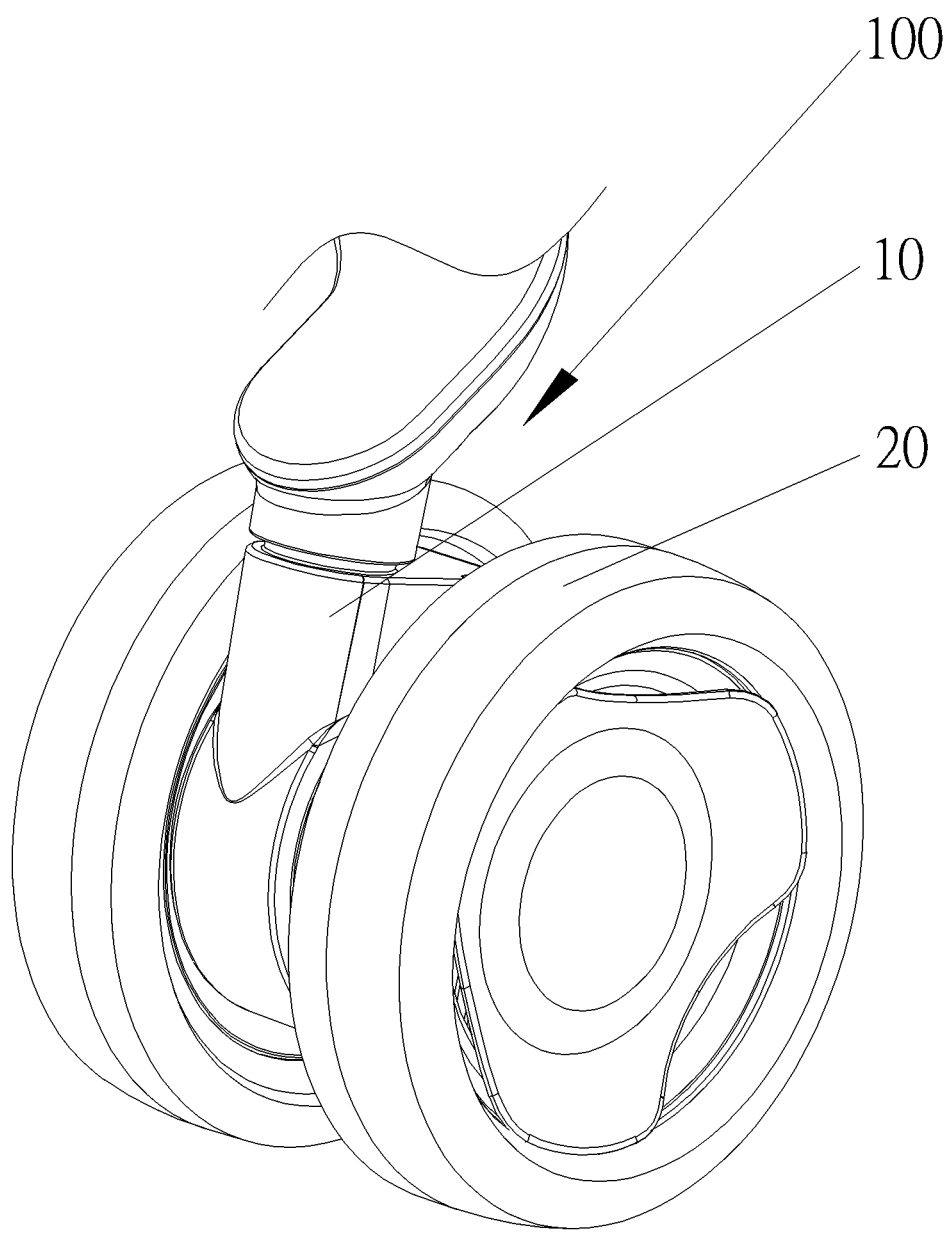
FIG. 1 is a diagram of a caster device according to an embodiment of the present invention.
Figure 2:
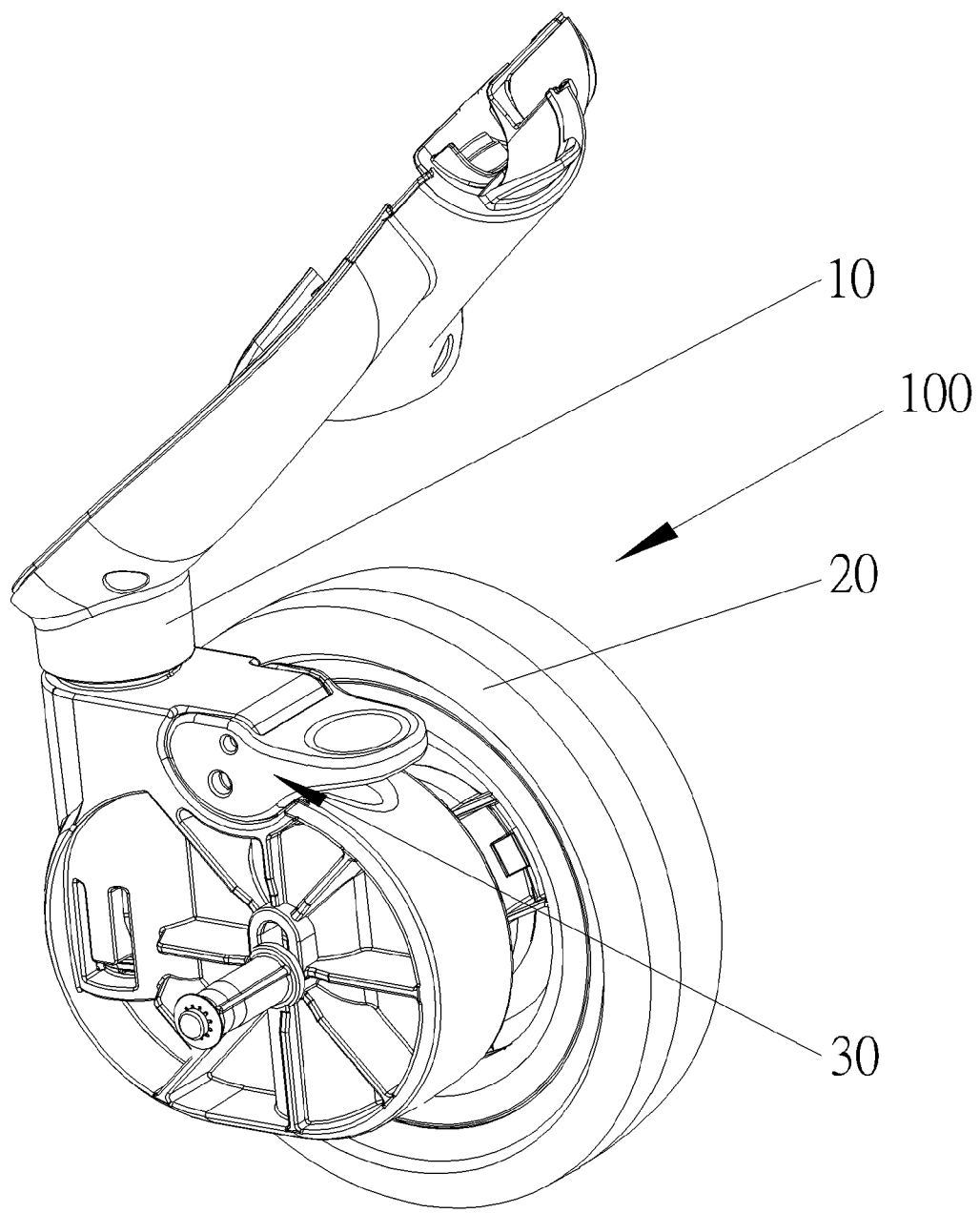
FIG. 2 is a partial diagram of the caster device according to the embodiment of the present invention.
Figure 3:
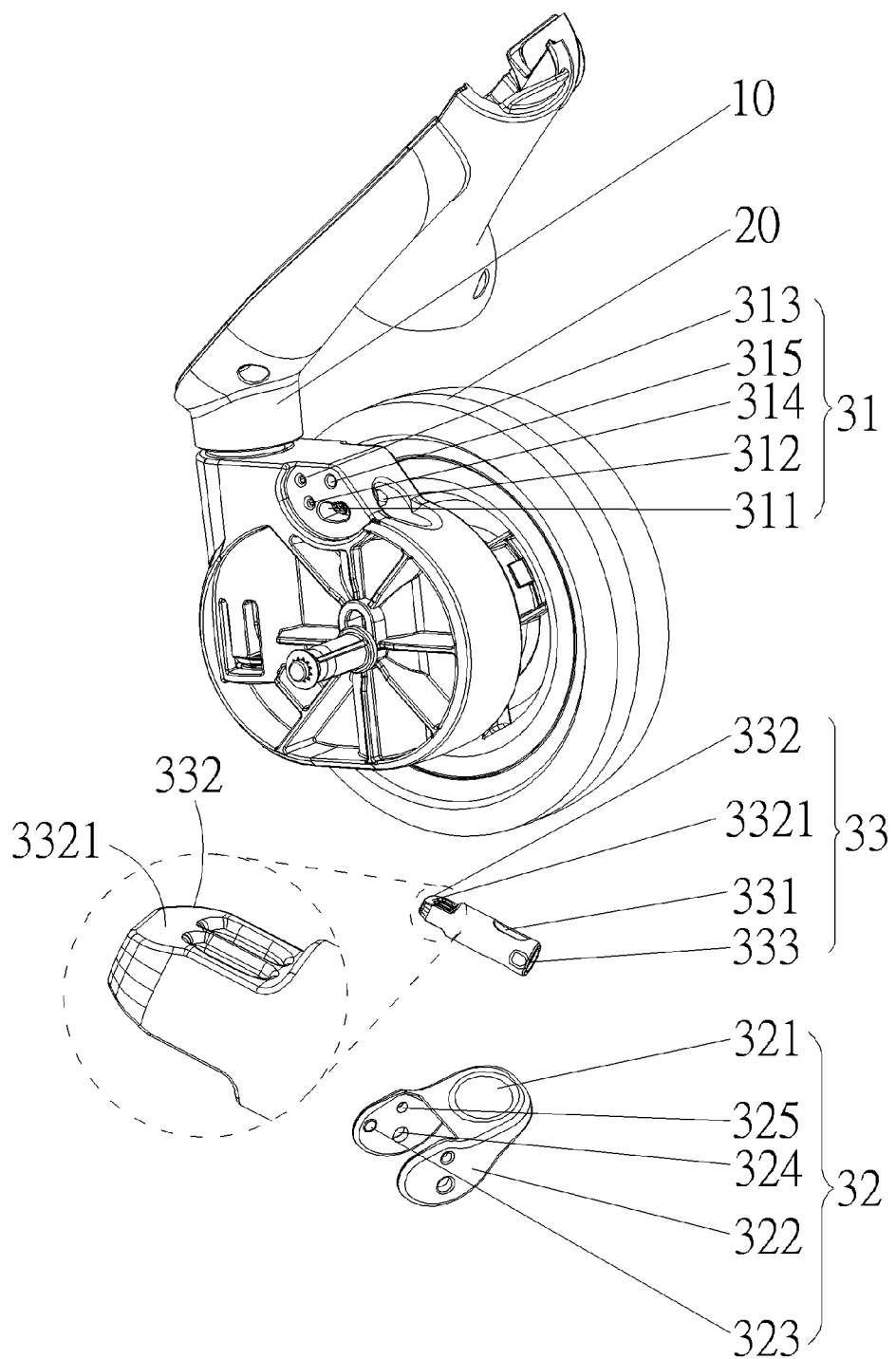
FIG. 3 is an exploded diagram of the caster device shown in FIG. 2 according to the embodiment of the present invention.

Please refer to FIG. 1 to FIG. 3. FIG. 1 is a diagram of a caster device 100 according to an embodiment of the present invention. FIG. 2 is a partial diagram of the caster device 100 according to the embodiment of the present invention. FIG. 3 is an exploded diagram of the caster device 100 shown in FIG. 2 according to the embodiment of the present invention. The caster device 100 includes a column 10, a wheel module 20 and a directional mechanism 30. The wheel module 20 can include two wheels or a single wheel. In this embodiment, the wheel module 20 includes two wheels. The wheel module 20 is pivoted on the column 10, so that the caster device 100 can be a universal caster. The directional mechanism 30 includes a directional component 33 movably disposed inside the wheel module 20 and detachably engaged with the column 10. A moving direction of the directional component 33 is intersected with a pivoting axis of the wheel module 20. Because the moving direction of the directional component 33 is intersected with the pivoting axis of the wheel module 20, the column 10 can be locked well, resulting in a better orientation effect of the directional mechanism 30. In addition, because the directional component 33 is movably disposed inside the wheel module 20, the directional component 33 can intersect with the pivoting axis rapidly, so as to increase an operating efficiency for orientation. Specifically, the moving direction of the directional component 33 can be orthogonal to the pivoting axis of the wheel module 20, or the moving direction of the directional component 33 can be oblique relative to the pivoting axis of the wheel module 20.

Figure 4:
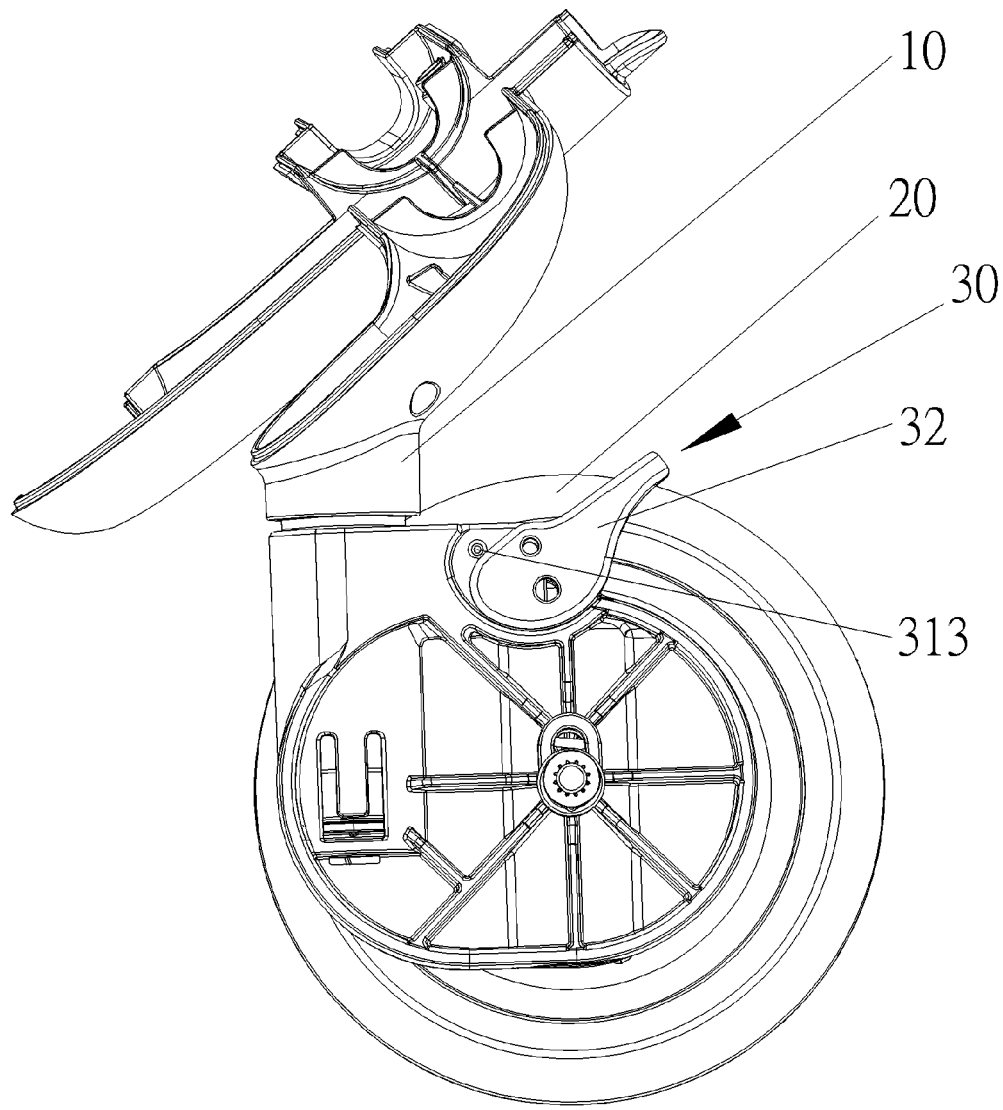
FIG. 4 is a diagram of a directional mechanism in a released state according to the embodiment of the present invention.
Figure 5:
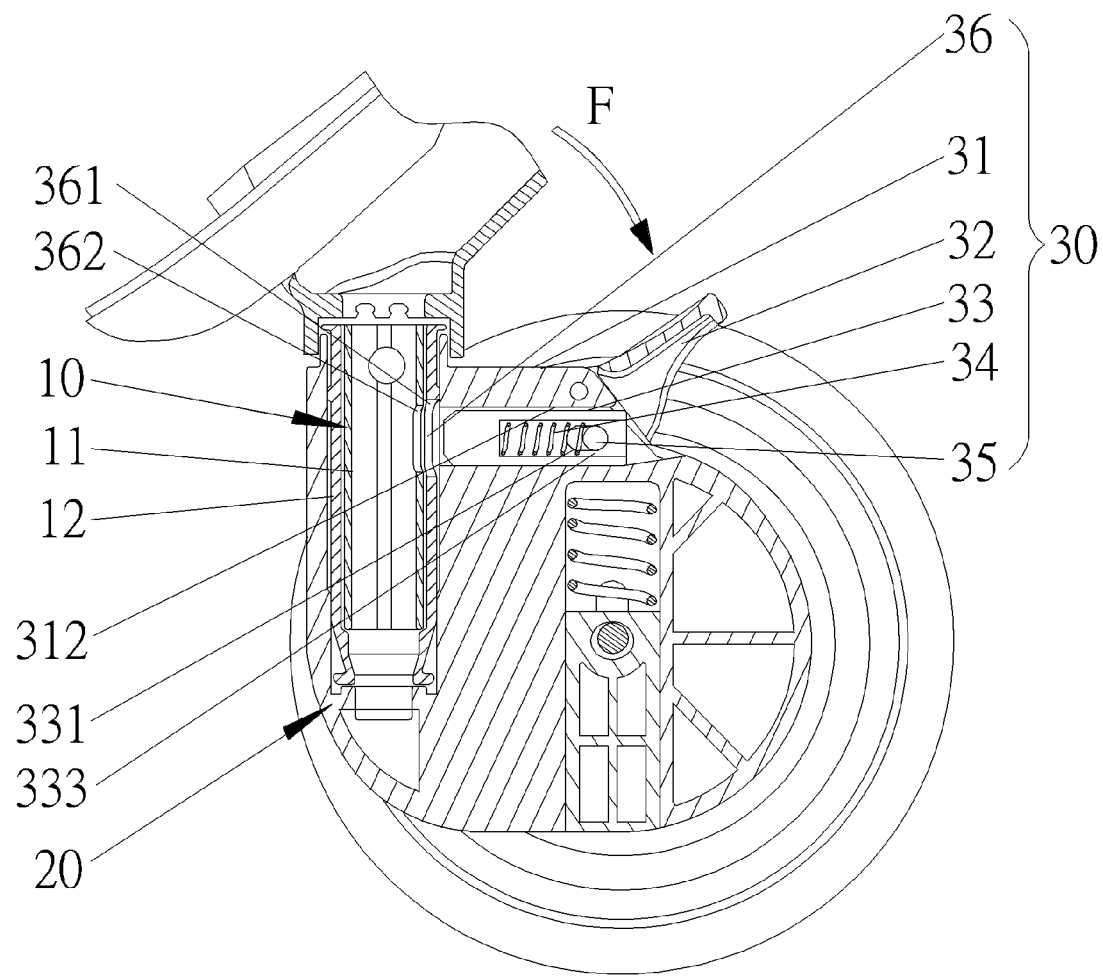
FIG. 5 is a sectional view of the directional mechanism shown in FIG. 4 according to the embodiment of the present invention.

Please refer to FIG. 3 to FIG. 5. FIG. 3 is an exploded diagram of the caster device 100 shown in FIG. 2 according to the embodiment of the present invention. FIG. 4 is a diagram of the directional mechanism 30 in a released state according to the embodiment of the present invention. FIG. 5 is a sectional view of the directional mechanism 30 shown in FIG. 4 according to the embodiment of the present invention. As shown in FIG. 5, the column 10 includes a supporting shaft 11 and a sheath 12. The sheath 12 covers the supporting shaft 11 and is pivoted on the wheel module 20. The directional component 33 is detachably engaged with the sheath 12. By an engagement of the directional component 33 and the sheath 12, it can result in a better and rapid orientation action. The wheel module 20 is pivoted on an outer peripheral of the column 10. The directional component 33 moves close to the column 10 and inside the wheel module 20 to engage with the column 10. On the other hand, the directional component 33 moves away from the column 10 and slides into the wheel module 20 to separate from the column 10. Specifically, a directional opening 36 is formed on the column 10, and the directional component 33 passes through the directional opening 36. It is easy to lock the column 10 by an engagement of the directional component 33 and the directional opening 36, resulting in the better orientation effect. More specifically, the column 10 includes the supporting shaft 11 and the sheath 12, and the sheath 12 is mainly for covering and protecting the supporting shaft 11, so as to prevent the supporting shaft 11 from being rusted or damaged. In addition, the sheath 12 can prevent the wheel module 20 from rocking when it rotates. The supporting shaft 11 and the sheath 12 are connected in a tight fit manner and rotate relative to the wheel module 20, but the supporting shaft 11 does not rotate relative to the sheath 12. The directional opening 36 includes a through hole 361 formed on the sheath 12, and an open hole 362 formed on the supporting shaft 11 and communicated with the through hole 361; and the directional component 33 passes through the through hole 361 and the open hole 362. Because the directional opening 36 includes the through hole 361 formed on the sheath 12, and the open hole 362 formed on the supporting shaft 11 and communicated with the through hole 361, the directional component 33 can be inserted into the directional opening 36 deeper, so that a force generated by the directional component 33 can overcome a rotational force of the column 10, so as to lock the column 10 well. Moreover, an aperture of the through hole 361 is greater than an aperture of the open hole 362, so as to facilitate the directional component 33 to insert into the directional opening 36.

Specifically, the directional mechanism 30 further includes an installing base 31 and an operating component 32. The installing base 31 is disposed on the wheel module 20, and the directional component 33 is slidably connected to the installing base 31. The operating component 32 is pivoted on the installing base 31 for driving the directional component 33. Specifically, a containing chamber 312 is formed inside the installing base 31 and communicated with the directional opening 36. The containing chamber 312 is for containing the directional component 33. In addition, the containing chamber 312 is not only for containing and fixing the direction of the directional component 33, but also for facilitating the directional component 33 to insert into the directional opening 36.

As shown in FIG. 3 and FIG. 5, the directional mechanism 30 further includes a connecting component 35 passing through the installing base 31, the operating component 32 and the directional component 33. The connecting component 35 can link the operating component 32, the installing base 31 and the directional component 33; that is, a force of the operating component 32 can be transmitted to the installing base 31, and then to the directional component 33, so as to drive the directional component 33 to perform an orientation operation. Specifically, a guiding hole 331 is formed on the directional component 33, an installing hole 311 is formed on the installing base 31, and an inserting hole 324 is formed on the operating component 32. The connecting component 35 passes through the inserting hole 324, the installing hole 311 and the guiding hole 331. It is more convenient to connect the operating component 32, the installing base 31 and the directional component 33, and it simplifies the manufacturing process by a matching connection of the connecting component 35 with the guiding hole 331, installing hole 311 and the inserting hole 324. More specifically, the guiding hole 331 and the installing hole 311 can be slots, so that the connecting component 35 may slide therewithin. That is, the guiding hole 331 is designed to be a slot, so that the force of the operating component 32 can be transferred as a driving force for driving the directional component 33 via the connecting component 35. In addition, the design of the slot facilitates the directional component 33 to move forward or backward. The slot design of the installing hole 311 facilitates the operating component 32 to move on the installing base 31 during the orientation operation, so that the force generated by movement of the operating component 32 can be effectively transmitted to the directional component 33 via the connecting component 35.

Please refer to FIG. 5, the directional mechanism 30 further includes a resilient component 34 disposed between the directional component 33 and the connecting component 35. The resilient component 34 is for driving the directional component 33 to slide. Specifically, an inner chamber 333 is formed inside the directional component 33 for receiving the resilient component 34, and the resilient component 34 contacts against an inner wall of the inner chamber 333 and the connecting component 35. The inner chamber 333 is for receiving and locating the resilient component 34, and for making the resilient component 34 better contact against the inner wall of the inner chamber 333 and the connecting component 35, so that a force received by the connecting component 35 can be transmitted to the resilient component 34 rapidly, and then the resilient component 34 drives the directional component 33 to slide.

As shown in FIG. 3, the operating component 32 includes an operating portion 321 and a driving portion 322. The driving portion 322 is connected to the operating portion 321 and pivoted on the installing base 31, and it is for driving the directional component 33. Specifically, the directional mechanism 30 further includes a pin, not shown in figures, passing through the installing base 31 and the driving portion 322. A hole 315 is formed on the installing base 31, and a hole 325 is formed on the driving portion 322. The pin, not shown in figures, passes through the hole 315 and the hole 325 for connecting the installing base 31 and the driving portion 322. The installing base 31 is easily pivoted on the operating component 32 by the pin. Specifically, as a force is applied to the operating portion 321 of the operating component 32, the operating component 32 can pivot around the pin on the driving portion 322, so as to generate a larger force to the directional component 33 to ensure that the directional component 33 is operated smoothly and quickly.

Furthermore, a protrusion 323 is formed on one of the driving portion 322 and the installing base 31; a first concave 313 and a second concave 314 corresponding to the protrusion 323 are formed on the other one of the driving portion 322 and the installing base 31. That is, as the protrusion 323 is formed on the driving portion 322, the first concave 313 and the second concave 314 are formed on the installing base 31. As the protrusion 323 is formed on the installing base 31, the first concave 313 and the second concave 314 are formed on the driving portion 322. In this embodiment, the protrusion 323 is formed on the driving portion 322, and the first concave 313 and the second concave 314 are formed on the installing base 31. As the operating component 32 rotates to an end position of a rotating region relative to the installing base 31, the protrusion 323 is engaged with the first concave 313, and the directional component 33 slidably inserts into the column 10. As the operating component 32 rotates back to an initial position of the rotating region relative to the installing base 31, the protrusion 323 is engaged with the second concave 314, and the directional component 33 slidably moves away from the column 10. In addition, the operating component 32 is easily fixed on the end position and the initial position by an engagement of the protrusion 323 with the first concave 313 and the second concave 314. The protrusion 323 can slide away between the first concave 313 and the second concave 314, so as to facilitate the pivoting operation of the operating component 32.

Specifically, a guiding portion 332 is formed on an end of the directional component 33, the end of the directional component is detachably engaged with the column 10, and a size of an outer peripheral of the guiding portion 332 decreases in a direction from the external portion towards the internal portion of the column 10. Specifically, the guiding portion 332 can be a cone-shaped structure, a tip taper-shaped structure, a square taper-shaped structure or a pyramidal-shaped structure. As the caster device 100 turns accidentally when in an orientation mode, the wheel module 20 is forced to rotate to push the directional component 33 which is inserted into the directional opening 36. At this time, the guiding portion 332 can guide the directional component 33 to slide out of the directional opening 36, so as to prevent the directional component 33 from being damaged and to result in a protecting function. Specifically, the guiding portion 332 includes an inclined surface 3321 formed on at least one of opposite sides of the directional component 33. The inclined surface 3321 can be a planar surface, a curved surface or an arc surface.

Specifically, the inclined surface 3321 faces the pivoting axis of the wheel module 20. More specifically, a normal of the inclined surface 3321 is intersected with the pivoting axis of the wheel module 20.

An operation principle of the directional mechanism 30 is further described with the figures as follows. As the directional mechanism 30 is in the released state, that is, the orientation operation is not performed, the operating component 32 is on the initial position of the rotating region capable of pivoting relative to the installing base 31. At this time, the protrusion 323 on the driving portion 322 is engaged with the second concave 314 of the installing base 31, so as to ensure that the operating component 32 is fixed on the initial position, as shown in FIG. 4. At the same time, the connecting component 35 for connecting the operating component 32, the installing base 31 and the directional component 33 is on a right side of the guiding hole 331 and the installing hole 311. The resilient component 34 contacts against the inner wall of the inner chamber 333 and the connecting component 35. Because the connecting component 35 is on the right side of the guiding hole 331, as shown in FIG. 5, the directional component 33 is inside the containing chamber 312, so as to ensure a universal movement of the caster device 100.

Figure 6:
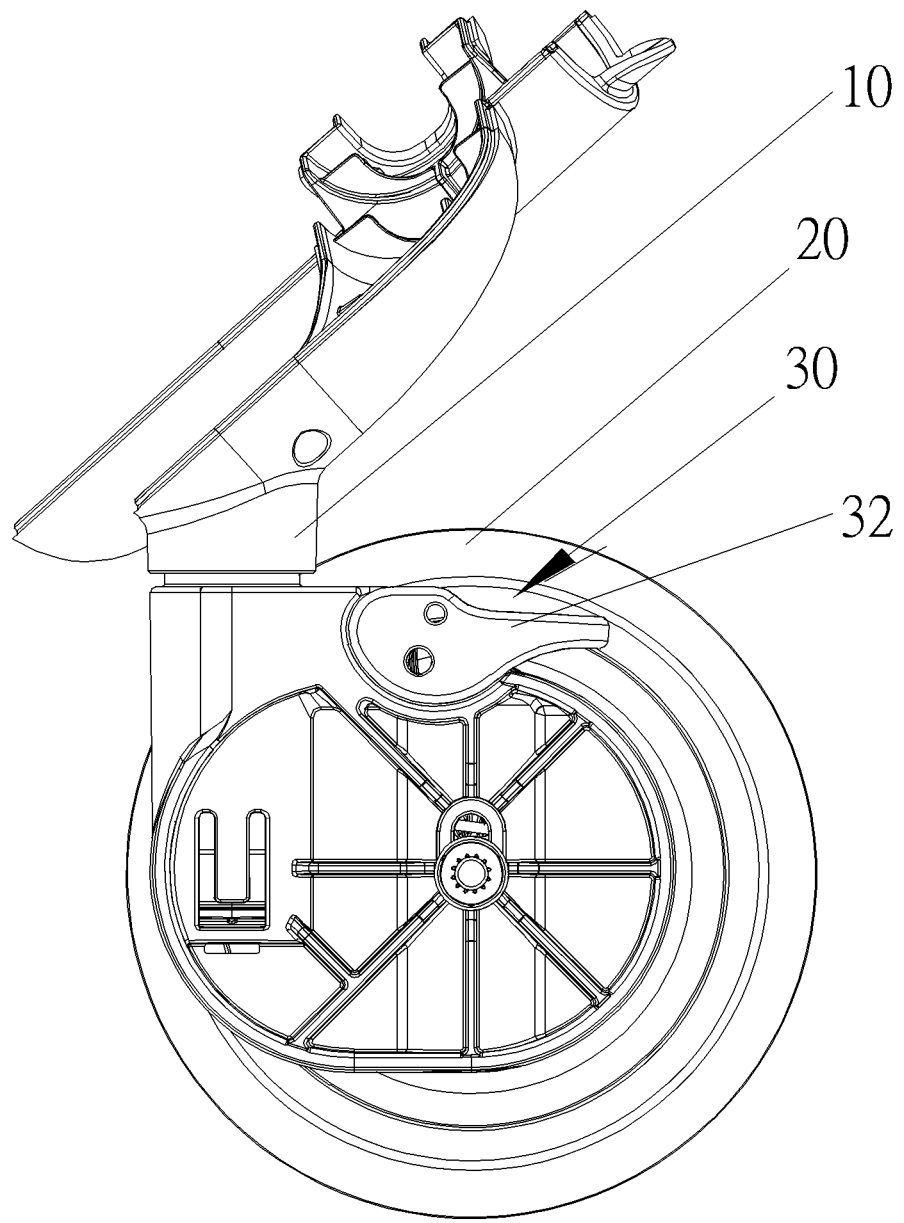
FIG. 6 is a diagram of the directional mechanism in a locked state according to the embodiment of the present invention.
Figure 7:
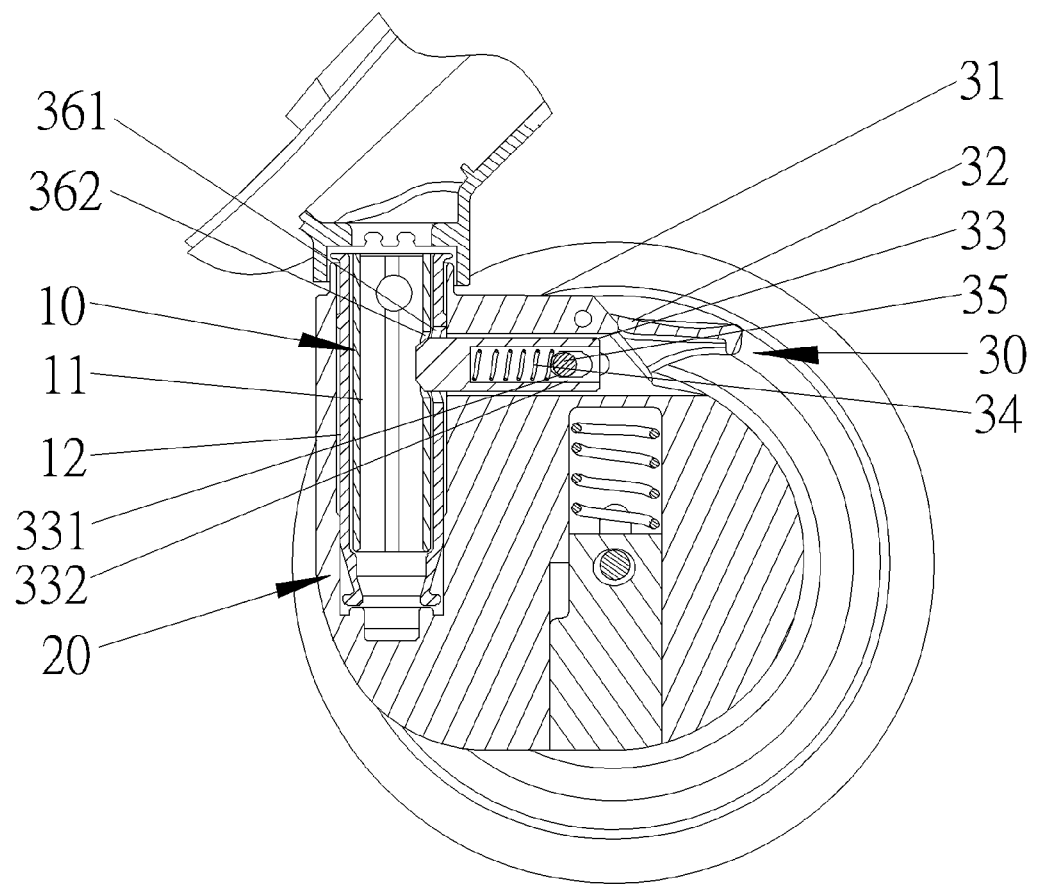
FIG. 7 is a sectional view of the directional mechanism shown in FIG. 6 according to the embodiment of the present invention.

Please refer to FIG. 5 to FIG. 7. FIG. 6 is a diagram of the directional mechanism 30 in a locked state according to the embodiment of the present invention. FIG. 7 is a sectional view of the directional mechanism 30 shown in FIG. 6 according to the embodiment of the present invention. As it is desired to perform the orientation operation, that is, the directional mechanism 30 is made to be in the locked state. As shown in FIG. 5, the operating portion 321 of the operating component 32 is pressed by a force F, so that the operating component 32 is forced to rotate downward, and the protrusion 323 on the driving portion 322 slides away from the second concave 314. Then, the operating component 32 rotates to the end position of the rotating region relative to the installing base 31, and the protrusion 323 is engaged with the first concave 313 of the installing base 31, so as to ensure that the operating component 32 can be fixed on the end position, as shown in FIG. 6. Correspondingly, the connecting component 35 slides from the right side to a left side of the installing hole 311, and the connecting component 35 slides along the guiding hole 331 from the right side to the left side to push the resilient component 34, so that the resilient component 34 is driven to press the directional component 33. Therefore, the directional component 33 moves with the connecting component 35 from the right side to the left side. At this time, an end of the directional component 33 in FIG. 5 passes through the containing chamber 312 gradually to insert into the directional opening 36. When the end of the directional component 33 enters into the directional opening 36, the directional component 33 passes through the sheath 12 of the column 10, and then the supporting shaft 11. Finally, as shown in FIG. 7, the directional component 33 locks the supporting shaft 11 and prevents the supporting shaft 11 from rotating, so that the caster device 100 is changed from a universal state to an orientation state. As it is desired to release the orientation state, it is only necessary to pull the operating portion 321 of the operating component 32, so that the operating component 32 rotates from the end position to the initial position of the rotating region relative to the installing base 31. Then, the directional component 33 is driven by the connecting component 35, so that the directional component 33 is moved from left to right to separate from the directional opening 36 and located in the containing chamber 312, so that the caster device 100 is changed from the orientation state to the universal state.

Furthermore, as the directional mechanism 30 is in the locked state, the wheel module 20 can only roll in a fixed direction. If the wheel module 20 turns accidentally, the wheel module 20 generates a rotational force to apply to the directional component 33, which is located in the directional opening 36, by the column 10, resulting in possible damage on the directional component 33. For preventing the above situation, in this embodiment, the inclined surface 3321 is formed on the guiding portion 332 at the end of the directional component 33, so that the guiding portion 332 guides the directional component 33 to slide out of the directional opening 36 when the directional component 33 is pressed by the rotational force of the wheel module 20, so as to prevent the directional component 33 from being damaged.

In contrast to the prior art, because the moving direction of the directional component of the present invention is intersected with the pivoting axis of the wheel module, the column is locked well, so as to result in a better orientation effect of the directional mechanism. The directional component is movably disposed inside the wheel module, so that the directional component is intersected with the pivoting axis of the wheel module rapidly, so as to increase an operating efficiency for orientation. Furthermore, the directional mechanism has a simple structure and may be operated easily, so that the directional mechanism of the caster device can be widely applied in the industry.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A caster device, comprising:
 a column whereon a directional opening is formed;
 a wheel module rotatably connected to an outer peripheral of the column; and
 a directional mechanism including:
  a directional component movably disposed inside the wheel module and detachably engaged with the column, wherein a moving direction of the directional component is intersected with a pivoting axis of the wheel module, the directional component is capable of moving close to the column and passing through the directional opening to engage with the column, and the directional component is further capable of moving away from the directional opening of the column to separate from the column;
  an installing base connected to the wheel module, the directional component being slidably connected to the installing base;
  an operating component pivoted on the installing base and for driving the directional component;
  a connecting component passing through the installing base, the operating component and the directional component; and
  a resilient component disposed between the directional component and the connecting component.

2. The caster device of claim 1, wherein the moving direction of the directional component is orthogonal to the pivoting axis of the wheel module.

3. The caster device of claim 1, wherein the moving direction of the directional component is oblique relative to the pivoting axis of the wheel module.

4. The caster device of claim 1, wherein the column includes:
 a supporting shaft; and
 a sheath covering the supporting shaft and rotatably connected to the wheel module, the directional component being detachably engaged with the sheath.

5. The caster device of claim 1, wherein the column includes a supporting shaft and a sheath covering the supporting shaft, the directional opening includes a through hole formed on the sheath, and an open hole formed on the supporting shaft and communicated with the through hole, and the directional component passes through the through hole and the open hole.

6. The caster device of claim 5, wherein an aperture of the through hole is greater than an aperture of the open hole.

7. The caster device of claim 1, wherein a containing chamber is formed inside the installing base and communicated with the directional hole, and the containing chamber is for containing the directional component.

8. The caster device of claim 1, wherein a guiding hole is formed on the directional component, an installing hole is formed on the installing base, an inserting hole is formed on the operating component, and the connecting component passes through the inserting hole, the installing hole and the guiding hole.

9. The caster device of claim 8, wherein the guiding hole and the installing hole are slots, so that the connecting component slides therewithin.

10. The caster device of claim 1, wherein an inner chamber is formed inside the directional component for receiving the resilient component, and the resilient component contacts against an inner wall of the inner chamber and the connecting component.

11. The caster device of claim 1, wherein the operating component includes:
 an operating portion; and
 a driving portion connected to the operating portion and pivoted on the installing base, for driving the directional component.

12. The caster device of claim 11, wherein the directional mechanism further includes a pin passing through the installing base and the driving portion.

13. The caster device of claim 11, wherein a protrusion is formed on one of the driving portion and the installing base, and a first concave and a second concave corresponding to the protrusion are formed on the other one of the driving portion and the installing base.

14. The caster device of claim 1, wherein a guiding portion is formed on an end of the directional component, the end of the directional component is detachably engaged with the column, and a size of an outer peripheral of the guiding portion decreases in a direction from the external portion towards the internal portion of the column.

15. The caster device of claim 14, wherein the guiding portion includes an inclined surface formed on at least one of opposite sides of the directional component.

16. The caster device of claim 15, wherein the inclined surface is a planar surface, a curved surface, or an arc surface.

17. The caster device of claim 15, wherein the inclined surface faces the pivoting axis of the wheel module.

18. The caster device of claim 17, wherein a normal of the inclined surface is intersected with the pivoting axis of the wheel module.

19. The caster device of claim 14, wherein the guiding portion is a cone-shaped structure, a tip taper-shaped structure, a square taper-shaped structure or a pyramidal-shaped structure.

* * * * *